(12) United States Patent
Cesaro et al.

(10) Patent No.: US 11,260,398 B2
(45) Date of Patent: Mar. 1, 2022

(54) TREATMENT APPARATUS OF A WASTE PRODUCT FOR SEPARATING RECYCLING FRACTIONS

(71) Applicant: CESARO MAC IMPORT S.R.L., Eraclea (IT)

(72) Inventors: Osvaldo Cesaro, Eraclea (IT); Cristiano Cesaro, Eraclea (IT)

(73) Assignee: Cesaro Mac Import S.r.l., Eraclea (IT)

( * ) Notice: Subject to any disclaimer, the term of this patent is extended or adjusted under 35 U.S.C. 154(b) by 222 days.

(21) Appl. No.: 16/632,712

(22) PCT Filed: Jul. 25, 2018

(86) PCT No.: PCT/IB2018/055551
§ 371 (c)(1),
(2) Date: Jan. 21, 2020

(87) PCT Pub. No.: WO2019/021211
PCT Pub. Date: Jan. 31, 2019

(65) Prior Publication Data
US 2020/0368756 A1 Nov. 26, 2020

(30) Foreign Application Priority Data

Jul. 25, 2017 (IT) .......................... 102017000084595
Dec. 1, 2017 (IT) .......................... 102017000138762

(51) Int. Cl.
*B03B 9/06* (2006.01)
*B02C 23/16* (2006.01)
(Continued)

(52) U.S. Cl.
CPC ................ *B03B 9/06* (2013.01); *B02C 23/16* (2013.01); *B03B 5/56* (2013.01); *B09B 3/00* (2013.01)

(58) Field of Classification Search
None
See application file for complete search history.

(56) References Cited

U.S. PATENT DOCUMENTS 3,146,071 A * 8/1964 Pierson ..................... B03B 9/06
422/187
5,104,047 A * 4/1992 Simmons ................ B02C 23/36
241/20

FOREIGN PATENT DOCUMENTS

| CH | 620859 A5 | 12/1980 |
| EP | 2006034 A2 | 12/2008 |
| WO | WO 2015/050433 A1 | 4/2015 |

* cited by examiner

*Primary Examiner* — Derek N Mueller
(74) *Attorney, Agent, or Firm* — R. Neil Sudol; Henry D. Coleman

(57) ABSTRACT

A substantially vertical separating column of a waste-product treatment apparatus has a cylindrical body with holes in a lateral surface, inferiorly of a waste-product supply opening. A bladed shaft rotates coaxially inside the cylindrical body. A first discharge mouth in an upper part of the cylindrical body expels a first waste-product recycling fraction, the fraction separated and transported upwards by the bladed shaft. A dilution group along the separating column supplies dilution liquid internally of the cylindrical body. A second discharge mouth in the lower part of the cylindrical body evacuates a second recycling fraction. A discharge conduit and a screw extend parallel to a tangent to the cylindrical body, facilitating extraction of the first recycling fraction to the discharge conduit. The bladed shaft comprises a rotor and, in proximity of the upper end, a plate fixed to a lateral rotor surface and arranged radially.

13 Claims, 4 Drawing Sheets

(51) Int. Cl.
*B03B 5/56* (2006.01)
*B09B 3/00* (2022.01)

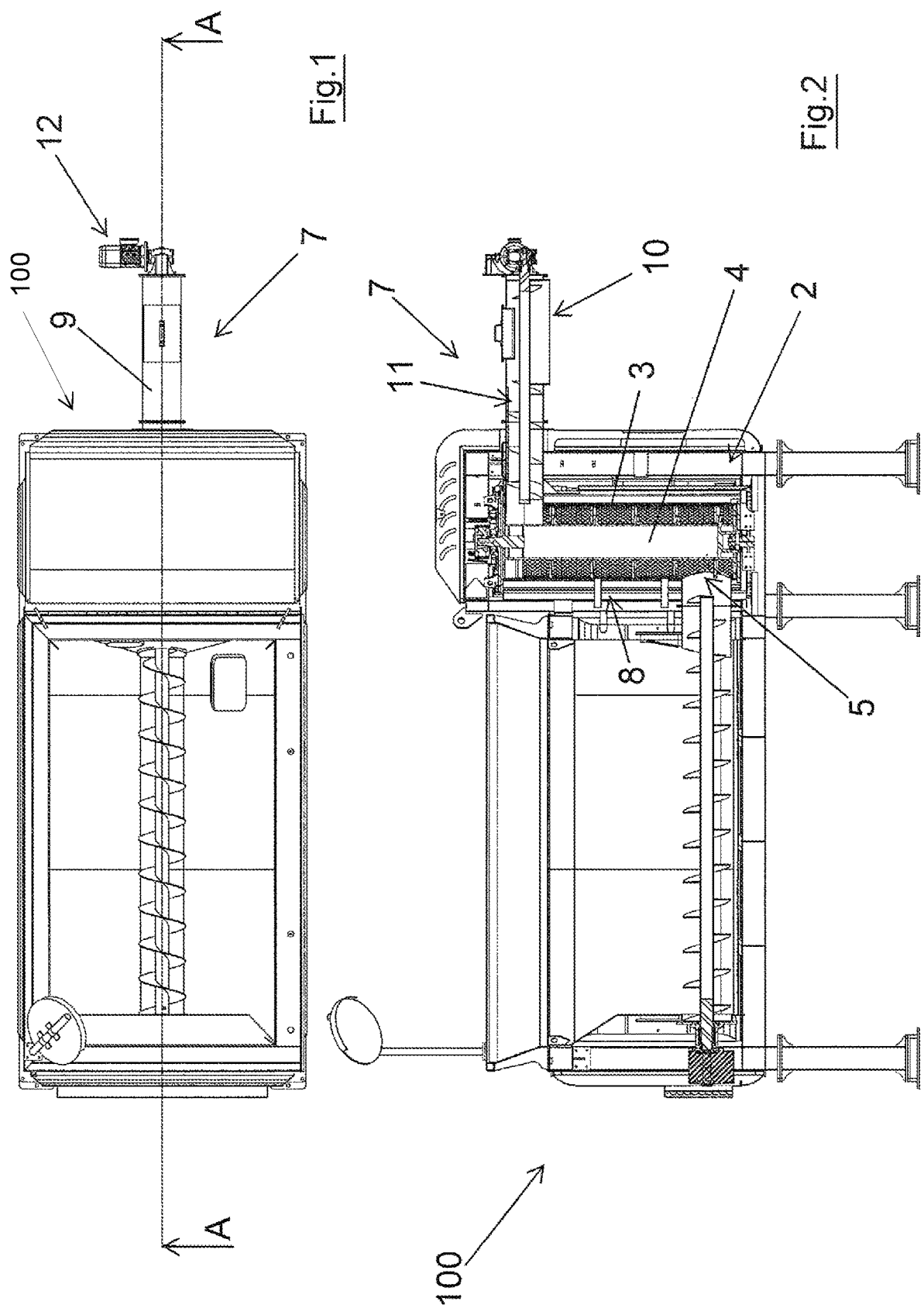

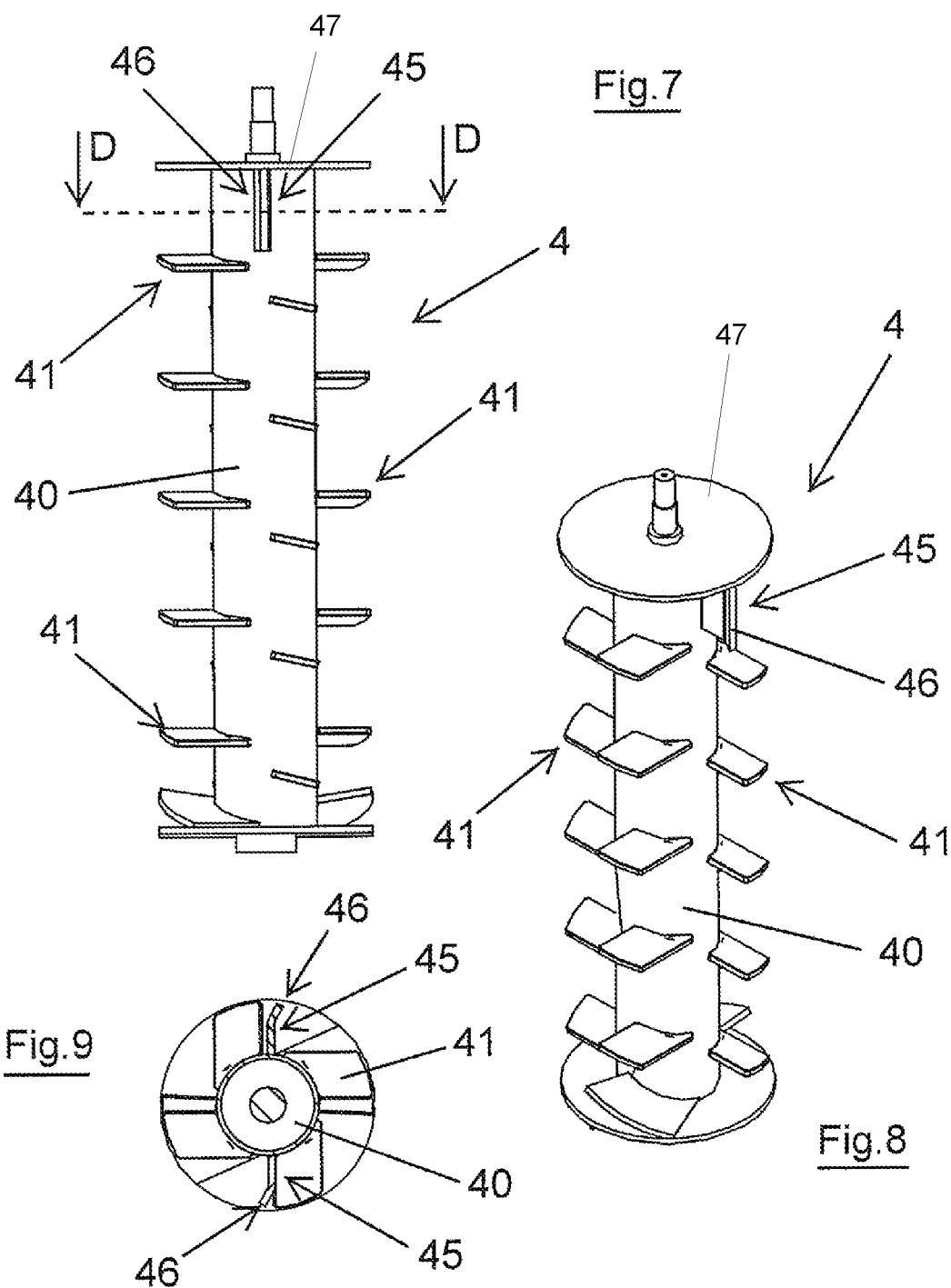

TREATMENT APPARATUS OF A WASTE PRODUCT FOR SEPARATING RECYCLING FRACTIONS

FIELD OF THE INVENTION

The present invention relates to the technical sector concerning treatment apparatus of a waste product for separating recycling fractions. The waste product can be sourced from separate collection of refuse or from industrial plants.

Recycling fractions are fractions of waste product, either homogeneous or heterogeneous, which might be sent off for recycling.

DESCRIPTION OF THE PRIOR ART

It is known that elimination of waste materials at present constitutes an extremely relevant issue which can lead to complications correlated to environmental pollution.

An appreciable contribution to the reduction of environmental pollution is represented by separate collection of waste, increasingly practised and capillary in the most industrialised countries.

In the case of separate collection of solid urban waste, for example, a first selection is made by the final consumers of the various products to be sent off to collection, following certain standard categories: plastic, glass, cans and tins, paper and cardboard, organic waste.

In the case of organic waste, coming from separate collection, there are often bodies that are extraneous mixed with the organic matter, such as for example paper packaging, cans, fragments of glass, metal materials, plastic materials, etc.

An apparatus (100) is known (illustrated in FIGS. 1 to 4) for selection of organic matter from an organic waste destined for recycling, especially suitable for elimination of residues and bodies that are extraneous to the organic matter of agro-industrial origin and for separation of foods in the solid state or liquid state from respective packaging constituted by cardboard or equivalent materials, comprising:

a) a separating column (2), arranged substantially vertical, in which a cylindrical body (3) is inserted, provided with a plurality of holes on the lateral surface and internally of which a bladed shaft (4) is positioned coaxially and activated in rotation by a first motor, the cylindrical body (3) being provided inferiorly of an opening (5) for supply of the organic waste to be treated;

b) an upper discharge mouth (6) arranged in the upper part of the cylindrical body (3) for expelling residues or bodies that are extraneous to the organic matter subjected to the treatment, which residues or bodies extraneous to the organic matter are separated and transported upwards by the bladed shaft (4);

c) a discharge group (7) for extraction from the upper discharge mouth (6) of the cylindrical body (3) of the above-mentioned residues or bodies extraneous to the organic matter present in the organic waste;

d) a dilution unit (8) positioned along the separating column (2) for supplying water or like dilution liquids internally of the cylindrical body (3);

e) a collecting tub, arranged below the separating column (2), for collecting the organic matter coming from the separating column (2).

In known ways, a discharge group (7) for extraction from the upper discharge mouth (6) of the cylindrical body (3) of the residues or bodies extraneous to the organic matter present in the organic waste, comprises:

a discharge conduit (9) connected at an end to the upper discharge mouth (6), and provided at the other end with an evacuation opening (10);

a screw (11) arranged coaxially internally of the discharge conduit (9) and activated in rotation by a second motor (12), arranged in proximity of the evacuation opening (10).

The axis of rotation of the screw (11) is arranged radially with respect to the cylindrical body (3) containing the bladed shaft (4) (see FIGS. 3, 4).

In this case the residues or bodies extraneous to the organic matter present in the organic waste are conveyed into the discharge conduit (9) by effect of the centrifugal force impressed by the bladed shaft (4), in a perpendicular direction with respect to the peripheral velocity direction of the residues or bodies extraneous to the organic matter internally of the cylindrical body (3).

This makes extraction thereof through the discharge mouth (7) difficult and involves residues or bodies extraneous to the organic matter remaining internally of the cylinder body (3) for long periods, with a reduction of the production capacity of the apparatus (100).

Further, the difficulty of extracting the residues or bodies extraneous to the organic matter through the discharge mouth (7) requires numerous unscheduled maintenance operations.

Further, the perpendicular positioning of the conduit (9) with respect to the peripheral velocity direction determines an overall reduction in the rotation velocity of the organic waste internally of the separating column (2) and therefore a reduction in the production capacity of the apparatus (100).

As regards the screw (11), this arrangement of the relative axis of rotation makes the use of a discharge conduit (9) of a blind type obligatory, i.e. with a closed head (90), and an evacuation opening (10) of the residues or bodies extraneous to the organic matter arranged on the lateral surface of the discharge conduit (9).

SUMMARY OF THE INVENTION

An object of the present invention is to obviate the above-mentioned drawbacks.

A further aim of the present invention is to facilitate the evacuation from the cylindrical body of the separating column of a first recycling fraction present in the waste product subjected to treatment.

The above-indicated aims are obtained by a treatment apparatus of a waste product for separating the recycling fractions according to claim 1.

The plurality of blades and the at least a plate advantageously guarantee formation of an updraught which tends to suck a first recycling fraction upwards and therefore towards the upper part of the cylindrical body. At the same time, the arrangement of the discharge conduit and the screw parallel to the tangential direction, with respect to the cylindrical body, facilitates the exit of the first recycling fraction from the cylindrical body of the separating column.

In other words, this arrangement of the discharge conduit is such that the waste product assumes, internally of the cylindrical body, a greater velocity of rotation and, therefore, an improvement in the production capacity of the treatment apparatus of a waste product takes place.

Further, the plurality of blades defines a rising path of the waste product which otherwise would risk falling towards the lower part of the cylindrical body by the force of gravity to which it is subject. Further, the plurality of blades reduces the waste product into smaller dimensions during the rising path, so as to facilitate the separation treatment. During this rising path, the second recycling fraction of the waste product is projected by a centrifugal force towards the lateral surface of the cylindrical body.

The treatment apparatus of a waste product can advantageously be used in a case where the waste product is a waste from a paper production process: in this case it has been observed that the first recycling fraction contains residues or bodies extraneous to a cellulose paste, which residues and bodies exit from the first discharge mouth, while the second recycling fraction is a cellulose paste, which exits from the second discharge mouth.

Further, the treatment apparatus of a waste product can advantageously be used in a case where the waste product is a packaging containing organic matter: in that case, it has been found that the first recycling fraction is a packaging, which exits from the first discharge mouth, while the second recycling fraction is an organic matter, which exits from the second discharge mouth.

Therefore this treatment apparatus of a waste product is flexible and adaptable to different operating configurations and different types of waste products in inlet to the treatment apparatus, guaranteeing good capacities of separation of the first recycling fraction and of the second recycling fraction.

In general in the following a first recycling fraction is taken to be a fraction of a waste product, homogeneous or heterogeneous, the components of which have a weight that is such as to be transportable upwards by the updraught. On the other hand the second recycling fraction is taken to mean a fraction of a waste product, homogeneous or heterogeneous, the components of which have a weight such as to be projected towards the lateral surface of the cylindrical body under the effect of the centrifugal force.

In both cases, these are fractions of waste product which might be sent for recycling.

BRIEF DESCRIPTION OF THE DRAWINGS

The characteristics of the invention are specified in the following with particular reference to some preferred, but not exclusive, embodiments, with reference to the accompanying tables of drawings, in which:

FIG. 1 illustrates a plan view of an apparatus according to the prior art;

FIG. 2 is a view along section A-A indicated in FIG. 1;

FIGS. 7 and 8 illustrate corresponding frontal and perspective views of a separating screw used in the treatment apparatus of a waste product according to the invention;

FIG. 9 is a view along section D-D indicated in FIG. 7.

DESCRIPTION OF THE PREFERRED EMBODIMENTS

Figure 3:
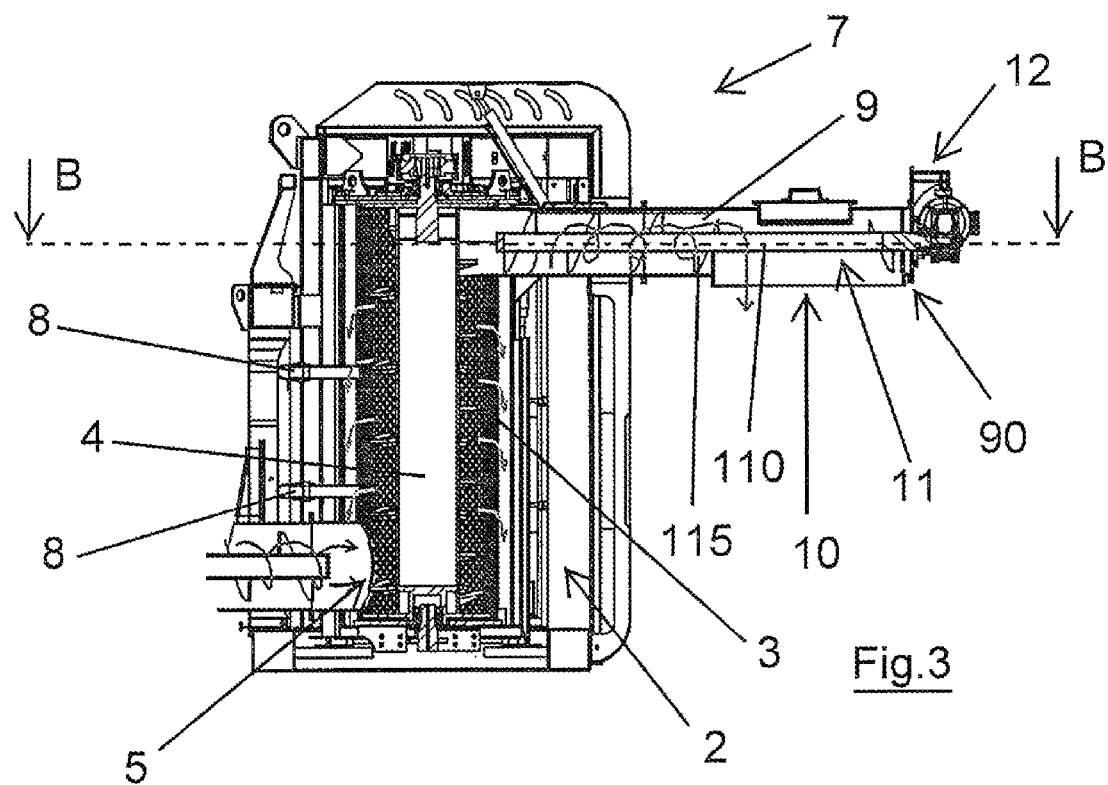
FIG. 3 is a larger-scale view of the separating column illustrated in FIG. 2.
Figure 4:
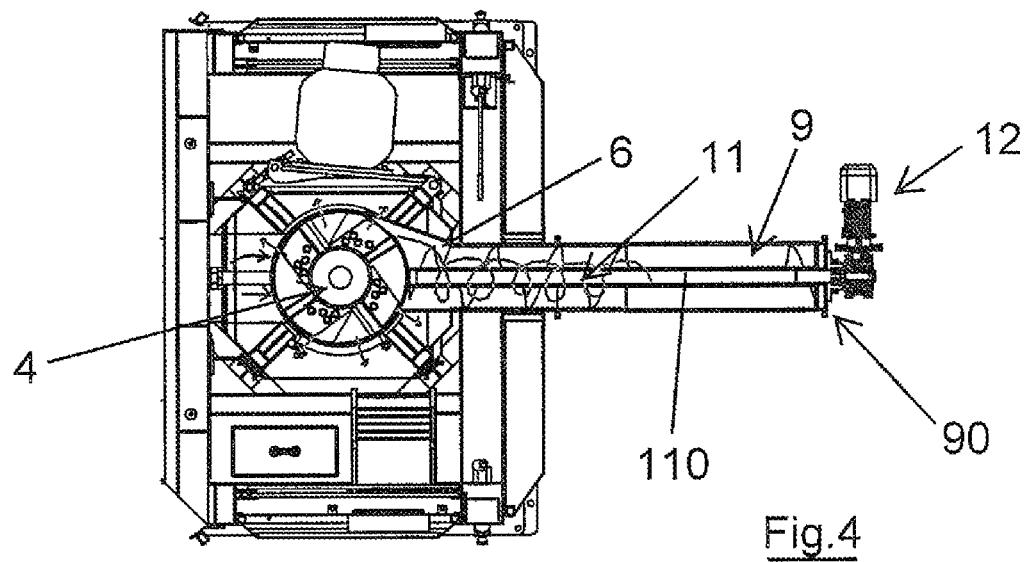
FIG. 4 is a view along section B-B indicated in FIG. 3.

With reference to the above-described tables of drawings, reference numeral 1 indicates a treatment apparatus of a waste product for separating recycling fractions, object of the invention.

It is specified that by first recycling fraction and second recycling fraction reference can be made to the above-mentioned definitions.

Reference in the following is made to FIGS. 5 to 9.

A treatment apparatus for treatment of a waste product (1) for separating recycling fractions, object of the present invention, comprises:

a separating column (2) arranged substantially vertically, comprising: a cylindrical body (3), provided on the lateral surface thereof with a plurality of holes and inferiorly of an opening (5) for supply of a waste product to be treated, and a bladed shaft (4) activated in rotation by a first motor and positioned coaxially internally of the cylindrical body (3);

a first upper discharge mouth (6) arranged in an upper part of the cylindrical body (3) for expelling a first recycling fraction present in the waste product subjected to the treatment, which first recycling fraction is separated and transported upwards by the bladed shaft (4);

a discharge group (7) for extraction through the first upper discharge mouth (6) and out of the cylindrical body (3) of the first recycling fraction present in the waste product;

the discharge group (7) comprising a discharge conduit (9) connected to the first upper discharge mouth (6);

a second discharge mouth arranged in the lower part of the cylindrical body (3) for evacuating a second recycling fraction.

The bladed shaft (4) inserted in the cylindrical body (3) of the separating column (2) comprises a first rotor (40) on the lateral surface of which a plurality of blades (41) is fixed, orientated so as to define a discontinuous helical winding. Further, the bladed shaft (4) comprises, in proximity of the upper end, at least a plate (45) fixed to the lateral surface of the first rotor (40) and arranged radially.

The above-mentioned treatment apparatus of a waste product (1) comprises: a screw (11) arranged coaxially internally of the discharge conduit (9) and activated in rotation by a second motor (12) for facilitating extraction of the first recycling fraction present in the waste product from the cylindrical body (3) to the discharge conduit (9); a dilution group (8) positioned along the separating column (2) for supplying water or like dilution liquids internally of the cylindrical body (3).

Figure 5:
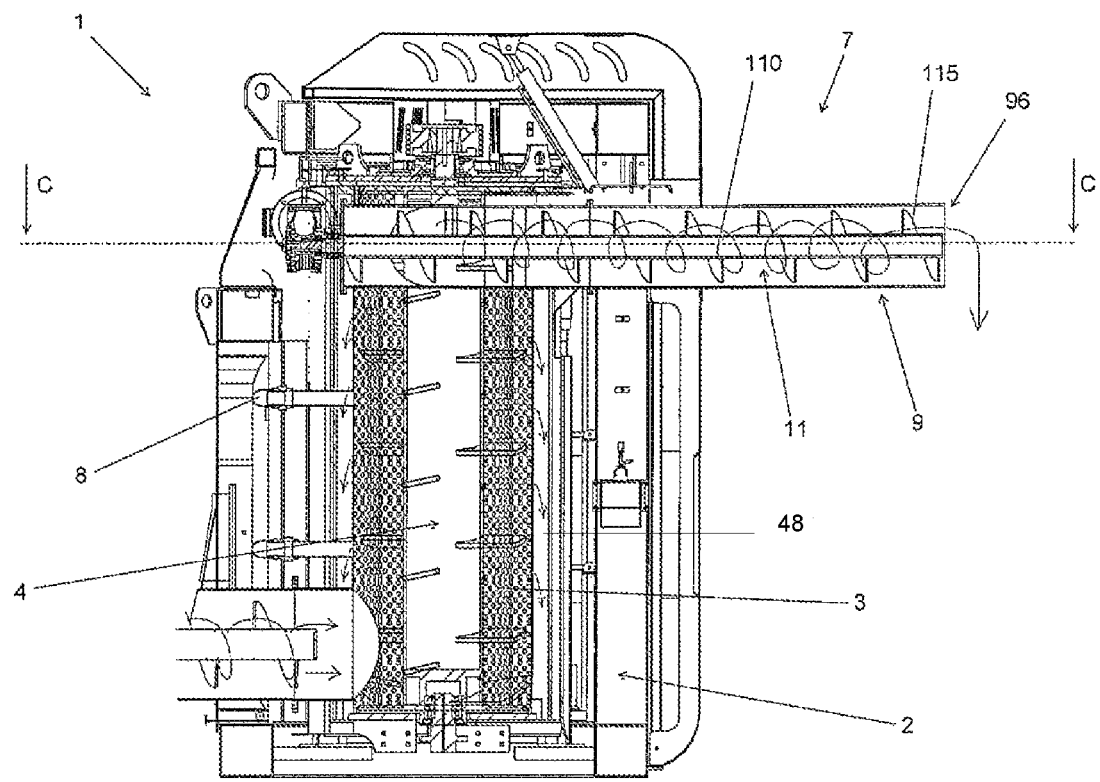
FIG. 5 is a view alike to that of FIG. 3 of a separating column of a treatment apparatus of a waste product according to the invention.
Figure 6:
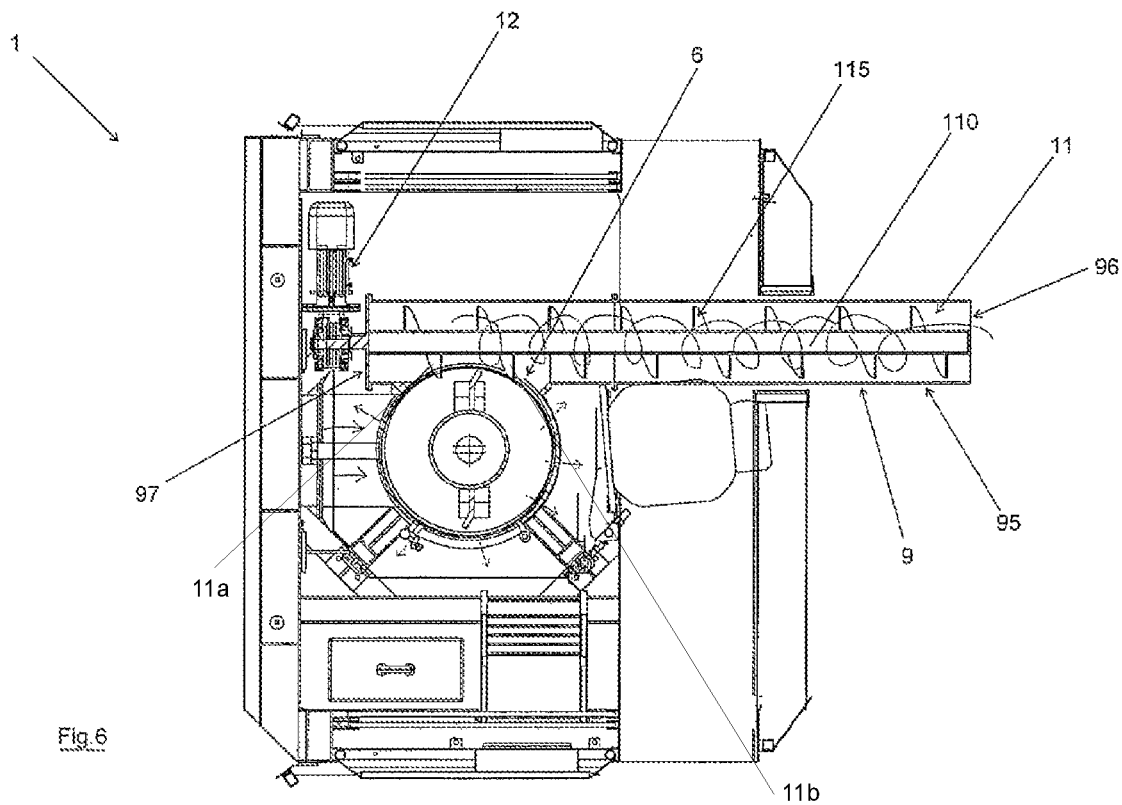
FIG. 6 is a view along section C-C indicated in FIG. 5.

Further, the discharge conduit (9) connected to the first upper discharge mouth (6), and the screw (11) are arranged parallel to the tangential direction with respect to the cylindrical body (3) (see FIGS. 5, 6).

This arrangement facilitates extraction of the first recycling fraction present in the waste product from the cylindrical body (3) to the discharge conduit (9).

The at least a plate (45) comprises a bent edge (46) at the free end of the at least a plate (45), which bent edge (46) is inclined so that when the first rotor (40) is activated in rotation in a predetermined rotation activation direction, it is orientated according to the rotation activation direction so as to facilitate extraction of the first recycling fraction present in the waste product.

The bent edge (46) limits the accumulation of the first recycling fraction at the first upper discharge mouth (6): this accumulation is created for the reasons that follow.

The first recycling fraction, during the upwards transport thereof, is also projected towards the walls of the cylindrical body (3) by effect of the centrifugal force. At the upper end of the bladed shaft (4), the first recycling fraction, subjected to the centrifugal force, accumulates in the area identified by the inlet to the first upper discharge mouth (6).

Once the bent edge (46) encounters the first recycling fraction subjected to the centrifugal force, at the upper end of the bladed shaft (4), the bent edge (46) advantageously projects the first recycling fraction internally of the discharge conduit (9) according to the advancement direction of the screw (11).

In other words, the bent edge (46) tends to modify the trajectory of the first recycling fraction so as to project it in the advancement direction of the first recycling fraction internally of the discharge conduit (9).

In detail, when the bent edge (46), during the rotation of the bladed shaft (4), encounters the first recycling fraction projected towards the walls of the cylindrical body (3) by effect of the centrifugal force, and which is located in proximity of the first upper discharge mouth (6), the bent edge (46) gives the first recycling fraction a velocity component parallel to the discharge conduit (9) and, therefore, parallel to the advancement direction of the screw (11). This facilitates the expulsion of the first recycling fraction to be extracted from the cylindrical body (3) through the discharge mouth (8). Further, the first recycling fraction is eliminated from the discharge mouth (8) towards the outside of the treatment apparatus (1), in an optimal way thanks to the presence of the screw (11).

The bent edge (46) advantageously facilitates the passage of the first recycling fraction that is in proximity of the first upper discharge mouth (6) into the first upper discharge mouth (6), thus preventing the first recycling fraction from being retained in circulation, internally of the cylindrical body (3), by the rotation of the bladed shaft (4).

The cylindrical body (3) is preferably hollow (see FIGS. 5 and 6).

The opening (5) is preferably arranged on the lower part of the lateral surface of the cylindrical body (3).

The discharge conduit (9) preferably has a straight extension (see FIGS. 5 and 6).

The discharge conduit (9) is preferably arranged tangentially to the cylindrical body (3) at the first upper discharge mouth (6) (see FIGS. 5 and 6).

Owing to the tangential arrangement of the discharge conduit (9) with respect to the cylindrical body (3) there is advantageously a greater velocity of rotation and, therefore, an improvement in the production capacity of the treatment apparatus (1) of a waste product, facilitating the exit of the first recycling fraction.

The bladed shaft (4) and the screw (11) are preferably arranged reciprocally and in a phase relation between them such that, when the screw (11) and the bladed shaft (4) are activated in rotation, the bent edge (46) of the at least a plate (45) is arranged, when it reaches the first upper discharge mouth (6), in the free space comprised between two consecutive portions (11a, 11b) of the screw (11) distant from one another by a pitch.

In this way, for example, at each rotation of the bladed shaft (4) two advancement rotations of the screw (11) take place, each by a distance equal to the pitch of the screw which constitutes the screw (11) itself.

The quantity of the first recycling fraction to be extracted is advantageously halved, i.e. the part of the first recycling fraction that is arranged in the upper part of the cylindrical body (3) and in proximity of the first upper discharge mouth (6), at each revolution of the bladed shaft (4), and the flow of the first recycling fraction to be extracted is regularised to prevent blockages.

Each blade of the plurality of blades (41) can project from the lateral surface of the first rotor (40) by about 20 cm so as to be brought in proximity of the lateral surface of the cylindrical body (3).

By way of example, the first rotor (40) can have a height of about 2 metres and a diameter of the shaft of about 30 cm. The blade of the plurality of blades (41) can be positioned along the lateral surface of the first rotor (40) by about 35 cm from one another.

Advantageously, the discontinuous helical winding of the plurality of blades (41) is such that the waste product, internally of the cylindrical body (3), is batted from one pallet to another of the plurality of blades (41).

The bladed shaft (4) can be activated in rotation by the first rotor (40) in such a way that the plurality of blades (41) and the at least a plate (45) can form an updraught, which sucks the first recycling fraction upwards in the cylindrical body (3), and can form a centrifugal force which projects the second recycling fraction towards the lateral surface of the cylindrical body (3).

With reference to FIG. 5, once the waste product is fed through the opening (5) in the cylindrical body (3) of the separating column, according to a perpendicular direction to the axis of the cylindrical body (3), the plurality of blades (41), by means of the rotation of the bladed shaft (4), raises the waste product upwards in the cylindrical body (3). The plurality of blades (41), during the raising upwards, reduces the waste product into smaller dimensions so as to facilitate the separation between the recycling fractions present in the waste product. Internally of the cylindrical body (3), the first recycling fraction is sucked upwards in the cylindrical body (3) by the updraught while the second recycling fraction is projected, by effect of the centrifugal force, towards the plurality of holes provided on the lateral surface of the cylindrical body (3) so that it can cross the plurality of holes.

The cylindrical body (3) and the second discharge mouth can be in fluid communication so that the second recycling fraction, once it passes through the plurality of holes provided on the lateral surface of the cylindrical body (3), is conveyed towards the second discharge mouth.

The treatment apparatus of a waste product (1) preferably comprises a chamber (48) which surrounds the cylindrical body (3) which is in fluid communication with the second discharge mouth so that the second recycling fraction, which passes through the plurality of holes provided on the lateral surface of the cylindrical body (3), is conveyed towards the second discharge mouth.

The at least a plate (45) preferably extends radially from the external surface of the first rotor (40) and extends along a plane comprising the axis of the first rotor (40) (FIGS. 7 and 8).

The development and extension of the at least a plate (45) advantageously gives the updraught created internally of the cylindrical body (3) a greater upwards suction force of the first recycling fraction. In other words, a greater suction is developed on the first recycling fraction in an upwards direction, towards the discharge conduit (9).

The cylindrical body (3) preferably comprises a covering element (47), which is fixed to the upper end of the bladed shaft (4) and which is orientated perpendicularly to the axis of the first rotor (40). The at least a plate (45) and the covering element (47) are in proximity or in reciprocal contact (see FIGS. 7 and 8).

The covering element (47) is preferably a circular plate. The covering element (47) can have a diameter of about 62 cm.

The covering element (47) can superiorly close the cylindrical body (3).

The covering element (47) advantageously operates as an abutment to the first recycling fraction which is separated and transported upwards.

The discharge conduit (9) comprises a lateral surface (95) and two heads (96, 97), the lateral surface (95) possibly comprising an opening connected to the first upper discharge mouth (6) (see FIGS. 5 and 6).

The second motor (12) for activating the screw (11) is advantageously arranged at the first head (97) of the discharge conduit (9) and is activated so as to facilitate extraction of the first recycling fraction present in the waste product from the cylindrical body (3) to the discharge conduit (9).

The second motor (12) for activating the screw (11) is arranged in proximity of the separating column (2), externally of the cylindrical body (3).

The second head (96) of the discharge conduit (9) is advantageously of an open type for enabling longitudinal discharge of the first recycling fraction present in the waste product.

This enables facilitating evacuation of the first recycling fraction from the discharge conduit (9) through the second head (96), which is of the open type.

In this way, the tangling phenomena of the first recycling fraction on the screw (11) are avoided, thus limiting the need for unscheduled maintenance intervention.

The plurality of blades (41) can be advantageously fixed to the lateral surface of the first rotor (40) by means of welding.

This enables limiting the contact surface of the bladed shaft (4) with the waste product to be treated, thus reducing the wear to which the plurality of blades (41) is subject.

The welding of the plurality of blades (41) to the lateral surface of the first rotor (40) further enables drastically reducing the probability of breaking and detaching of each blade of the plurality of blades (41), with a consequent safeguarding of the internal components of the treatment apparatus of a waste product (1).

By way of example, the bladed shaft (4) can comprise, in proximity of the upper end, a pair of opposite plates (45) fixed to the lateral surface of the first rotor (40) and arranged radially (see FIG. 9).

The pair of plates (45) preferably extends radially from the external surface of the first rotor (40) and extends along a plane comprising the axis of the first rotor (40). Like the bladed shaft (4), the screw (11) inserted in the discharge conduit (9) of the discharge group (7) can also comprise a second rotor (110) on a lateral surface of which a plurality of helical elements (115) is fixed, having a geometry and a pitch necessary for facilitating extraction of the first recycling fraction present in the waste product.

In the same way, the helical elements (115) can be fixed to the lateral surface of the second rotor (110) by means of welding.

In the following the waste product is taken to be waste deriving from the production of paper. At the end of the paper production process a waste product is created composed of cellulose paste and bodies extraneous to the cellulose paste, such as for example: polyethylene, coarse materials, rags and filaments of fabrics or other material, wood iron and aluminium. Specifically, the above-mentioned waste product is known as "paper-manufacturing pulper waste" and is at present sent on for elimination.

However, a certain quantity of cellulose paste can be recycled from the waste product in order to be re-utilised in the paper production cycle.

The present invention relates to the use of the treatment apparatus of a waste product (1), as described in the foregoing, in which the waste product is waste from a paper production process, the first recycling fraction is made up of residues or bodies extraneous to a cellulose paste and the second recycling fraction is a cellulose paste.

The cellulose paste that separates from the waste of a paper production process, as a second recycling fraction, can be a chemical cellulose paste or a semi-chemical or cellulose paste or a mechanical and cellulose paste.

In paper production processes different types of cellulose paste can be used. In the make-up of the waste from a paper production process the same type of cellulose paste will be found which was initially used in the same paper production process.

Further, the present invention relates to the use of the treatment apparatus of a waste product (1), as described in the foregoing, in which the waste product is a packaging containing organic matter, the first recycling fraction is a packaging and the second recycling fraction is an organic matter.

The organic matter that separates from the packaging containing organic matter, being the second recycling fraction, is a fraction of organic matter that is largely homogeneous, with a very low percentage of residues or bodies extraneous to the organic matter, ready to be sent on to recycling or recovery.

A treatment apparatus of a waste product (1) for separating recycling fractions is described, in a case where the waste product is a waste from a paper production process.

The waste of a paper production process is fed to the treatment apparatus through the opening (5), arranged on the lateral surface of the cylindrical body (3), so that the waste of a paper production process is fed in a perpendicular direction to the axis of the cylindrical body (3). At the same time the dilution group (8) is activated to supply water internally of the cylindrical body (3). Once the first rotor (40) is activated in rotation, the blades of the plurality of blades (41), in particular the blades arranged on the lower face of the first rotor (40), tend to transport the waste of a paper production process being infed upwards. Further, the plurality of blades (41) reduces the waste of a paper production process into smaller dimensions so as to facilitate the separation between the recycling fractions. At this point, the plurality of blades (41) and the at least a plate (45) form the updraught which sucks the residues or bodies extraneous to a cellulose paste upwards in the cylindrical body (3). Consequently, the residues or bodies extraneous to the cellulose paste are sucked towards the first upper discharge mouth (6). Instead, the cellulose paste and the water, in the rising path due to the operation of the plurality of blades (41), are subject to the centrifugal force that projects them towards the plurality of holes arranged on the lateral surface of the cylindrical body (3) so as to be conveyed towards the second discharge mouth via the chamber (48).

Likewise, the same operation takes place in the case where the waste product is a packaging containing organic matter. Differently to the foregoing, once the first rotor (40) is activated in rotation, the blades of the plurality of blades (41) arranged inferiorly of the first rotor (40) will break the packaging containing organic matter, so as to separate the packaging from the organic matter contained.

On the basis of the foregoing, it is clear that the treatment apparatus of waste product (1) is able to facilitate the evacuation from the cylindrical body (3) of the separating column (2) of the first recycling fraction present in the waste product subjected to the treatment, for example residues or bodies extraneous to the cellulose paste to be recycled or the organic matter to be recovered.

The treatment apparatus of a waste product (1) for separating recycling fractions of the invention is, further, able to significantly limit the waiting time of the first recycling fraction, present in the waste product, internally of the cylindrical body (3).

Further, it facilitates the separation between the organic matter and the packaging due to the increased velocity to which the packaging containing organic matter in centrifugal motion is subjected.

This is fundamentally due to the discharge conduit (9) connected to the first upper discharge mouth (6), and the screw (11) arranged substantially tangentially with respect to the cylindrical body (3) of the separating column (2).

The treatment apparatus of a waste product (1) further enables accelerating the evacuation of the first recycling fraction present in the waste product from the discharge conduit (9).

This is thanks to the arrangement of the second motor (12) of the screw (11) at the first head (97) of the discharge conduit (9), in proximity of the separating column (2), externally of the cylindrical body (3).

In this case the second head (96) of the discharge conduit (9) can advantageously be of an open type for enabling longitudinal discharge of the first recycling fraction present in the waste product, drastically limiting tangling phenomena in the first recycling fraction on the screw (11).

Consequently the unscheduled maintenance operations are greatly reduced.

The fixing by welding of the plurality of blades (41) to the lateral surface of the first rotor (40) enables limiting the contact surface between the bladed shaft (4) and the waste product to be treated, reducing the wear to which the plurality of blades is subjected (41).

This further enables drastically reducing the probability of breaking and detaching each blade of the plurality of blades (41), with a consequent safeguarding of the internal components of the treatment apparatus of a waste product (1).

The invention claimed is:

1. A treatment apparatus of a waste product for separating recycling fractions, comprising:
    a separating column arranged substantially vertically, comprising: a cylindrical body provided on the lateral surface thereof with a plurality of holes and inferiorly of an opening for supply of a waste product to be treated, and a bladed shaft activated in rotation by a first motor and positioned coaxially internally of the cylindrical body;
    a first upper discharge mouth arranged in an upper part of the cylindrical body for expelling a first recycling fraction present in the waste product subjected to the treatment, which first recycling fraction is separated and transported upwards by the bladed shaft;
    a discharge group for extraction through the first upper discharge mouth and out of the cylindrical body of the first recycling fraction present in the waste product;
    the discharge group comprising a discharge conduit connected to the first upper discharge mouth;
    a second discharge mouth arranged in the lower part of the cylindrical body for evacuating a second recycling fraction;
    wherein the bladed shaft inserted in the cylindrical body of the separating column comprises a first rotor on the lateral surface of which a plurality of blades is fixed, orientated so as to define a discontinuous helical winding;
    and wherein the bladed shaft comprises, in proximity of the upper end, at least a plate fixed to the lateral surface of the first rotor and arranged radially;
    further comprising:
    a screw arranged coaxially internally of the discharge conduit and activated in rotation by a second motor for facilitating extraction of the first recycling fraction present in the waste product from the cylindrical body to the discharge conduit; and
    a dilution group positioned along the separating column for supplying water or like dilution liquids internally of the cylindrical body,
    the discharge conduit, connected to the first upper discharge mouth, and the screw being arranged parallel to the tangential direction with respect to the cylindrical body, so as to facilitate extraction of the first recycling fraction present in the waste product from the cylindrical body to the discharge conduit,
    the at least a plate comprising a bent edge at the free end of the at least a plate, which bent edge is inclined so that when the first rotor is activated in rotation in a predetermined rotation activation direction, the bent edge is orientated according to the rotation activation direction so as to facilitate extraction of the first recycling fraction present in the waste product.

2. The treatment apparatus of a waste product of claim 1, wherein the discharge conduit has a straight extension.

3. The treatment apparatus of a waste product of claim 1, wherein the discharge conduit is arranged tangentially to the cylindrical body at the first upper discharge mouth.

4. The treatment apparatus of a waste product of claim 3, wherein the bladed shaft and the screw are reciprocally arranged and activated in a phase relation so that, when the screw and the bladed shaft are activated in rotation, the bent edge of the at least a plate is arranged, when it reaches the first upper discharge mouth, in the free space comprised between two consecutive portions of the screw distant from one another by a pitch.

5. The treatment apparatus of a waste product of claim 1, further comprising a chamber which surrounds the cylindrical body which is in fluid communication with the second discharge mouth so that the second recycling fraction, which passes through the plurality of holes provided on the lateral surface of the cylindrical body, is conveyed towards the second discharge mouth.

6. The treatment apparatus of a waste product of claim 1, wherein the at least a plate extends radially from the external surface of the first rotor and extends along a plane comprising the axis of the first rotor.

7. The treatment apparatus of a waste product of claim 6, wherein the cylindrical body comprises a covering element, which is fixed to the upper end of the bladed shaft and which is orientated perpendicularly to the axis of the first rotor; the at least a plate and the covering element being in proximity or in reciprocal contact each other.

8. The treatment apparatus of a waste product of claim 1, wherein the discharge conduit comprises a lateral surface and two heads; the lateral surface of the discharge conduit comprising an opening connected to the first upper discharge mouth; the second motor for activating the screw being arranged at the first head of the discharge conduit and being activated so as to facilitate extraction of the first recycling fraction present in the waste product from the cylindrical body to the discharge conduit; the second head of the discharge conduit being of an open type for enabling longitudinal discharge of the first recycling fraction present in the waste product.

9. The treatment apparatus of a waste product of claim 1, wherein the bladed shaft comprises, in proximity of the upper end, a pair of opposite plates fixed to the lateral surface of the first rotor and arranged radially.

10. The treatment apparatus of a waste product of claim 9, wherein the pair of plates extends radially from the external surface of the first rotor and extends along a plane comprising the axis of the first rotor.

11. The treatment apparatus of a waste product of claim 1, wherein the screw inserted in the discharge conduit of the discharge group comprises a second rotor on a lateral surface of which a plurality of helical elements is fixed, having a geometry and a pitch necessary for facilitating extraction of the first recycling fraction present in the waste product.

12. Use of the treatment apparatus of a waste product of claim 1, wherein the waste product is a waste from a paper production process, wherein the first recycling fraction is constituted by residues or bodies extraneous to a cellulose paste and wherein the second recycling fraction is a cellulose paste.

13. Use of the treatment apparatus of a waste product of claim 1, wherein the waste product is a packaging containing organic matter, wherein the first recycling fraction is a packaging and wherein the second recycling fraction is an organic matter.

* * * * *